United States Patent [19]

Teel

[11] Patent Number: 4,938,241

[45] Date of Patent: Jul. 3, 1990

[54] RV SANITARY DUMPING BAY AND POTABLE WATER SYSTEM

[76] Inventor: James M. Teel, 625 Blue Rise La., Wetumpka, Ala. 36092

[21] Appl. No.: 222,411

[22] Filed: Jul. 21, 1988

[51] Int. Cl.$^5$ ............................................. B08B 3/02
[52] U.S. Cl. ............................ 134/104.2; 134/167 R; 134/198; 134/201
[58] Field of Search ............ 134/104.2, 166 C, 167 R, 134/167 C, 171, 198, 201, 115; 4/661, 662; 405/41, 52; 404/2, 4; 210/163, 165, 169

[56] References Cited

U.S. PATENT DOCUMENTS

| | | | |
|---|---|---|---|
| 1,962,793 | 6/1934 | Vogel | 134/198 X |
| 2,490,422 | 12/1949 | Denison | 134/167 C X |
| 3,157,904 | 11/1964 | Flodell | 134/115 R X |
| 3,372,875 | 3/1968 | Torrey | 134/115 R X |
| 3,526,547 | 9/1970 | Shock | 134/166 C X |
| 3,605,135 | 9/1971 | Tan | 134/166 C UX |
| 3,633,219 | 1/1972 | Byrd . | |
| 4,054,149 | 10/1977 | Nelson | 134/167 C |
| 4,193,873 | 3/1980 | Thrasher . | |
| 4,332,681 | 6/1982 | Jambry et al. . | |
| 4,491,150 | 1/1985 | Holman et al. . | |

Primary Examiner—Frankie L. Stinson
Attorney, Agent, or Firm—Fleit, Jacobson, Cohn, Price, Holman & Stern

[57] ABSTRACT

A dumping bay for the disposal of recreational vehicle waste at a campsite and includes a drain for receiving waste from the holding tank of a recreational vehicle through a dump hose. The dumping bay includes a water control facility which can supply flushing water to the drain and which can also provide an independent supply of potable water to a recreational vehicle. The potable water is supplied through an articulated hand-held nozzle and it can also be used for providing additional flushing water to the drain and water to clean components if required. The components of the invention are incorporated into a central serviceable unit accessible to users.

4 Claims, 2 Drawing Sheets

RV SANITARY DUMPING BAY AND POTABLE WATER SYSTEM

BACKGROUND OF THE INVENTION

Field of the Invention

This invention relates to apparatus for use at campsites and like recreational facilities to facilitate sanitary disposal of recreational vehicle waste and provide a supply of potable water.

It is common practice at campgrounds and the like to provide drain fittings, for example, into which the contents of recreational vehicle waste holding tanks may be discharged through a suitable hose or the like. Generally, the hose outlet is placed directly into the drain fitting, usually without provision being made for subsequently flushing or cleaning the drain fitting or other components. The sanitary aspects of the known systems may, therefore, not always be entirely satisfactory.

SUMMARY OF THE INVENTION

It is an object of the invention to provide a dumping bay for recreational vehicle waste which has enhanced sanitation.

Another object of the invention is to provide a dumping bay which has a drain fitting that includes a flushing facility.

Yet another object of the invention is to provide a combined unit which provides a flushing system for a dumping bay drain fitting and which also includes a separate potable water supply.

Briefly stated, the invention provides a sanitary dumping bay for use in association with RV's and which includes a sanitary flushing drain, and a water control supply assembly which includes a flushing supply and control system for the drain in combination with a potable water supply and control system. The flushing control system includes a foot-operated flush valve, and the water supply system includes a water column assembly with a control valve, an articulated section, a flexible hose and a hand-held water outlet nozzle to supply potable water to RV's and provide additional flushing and cleaning water to the drain fitting.

The dumping bay is intended primarily to provide a sanitary means for disposing of recreational vehicle raw waste and/or sewage, and for supplying potable water with a volume/controlled backflow prevented water supply. The invention is constructed to comply with National Plumbing Codes and EPA requirements.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENT

Figure 1:
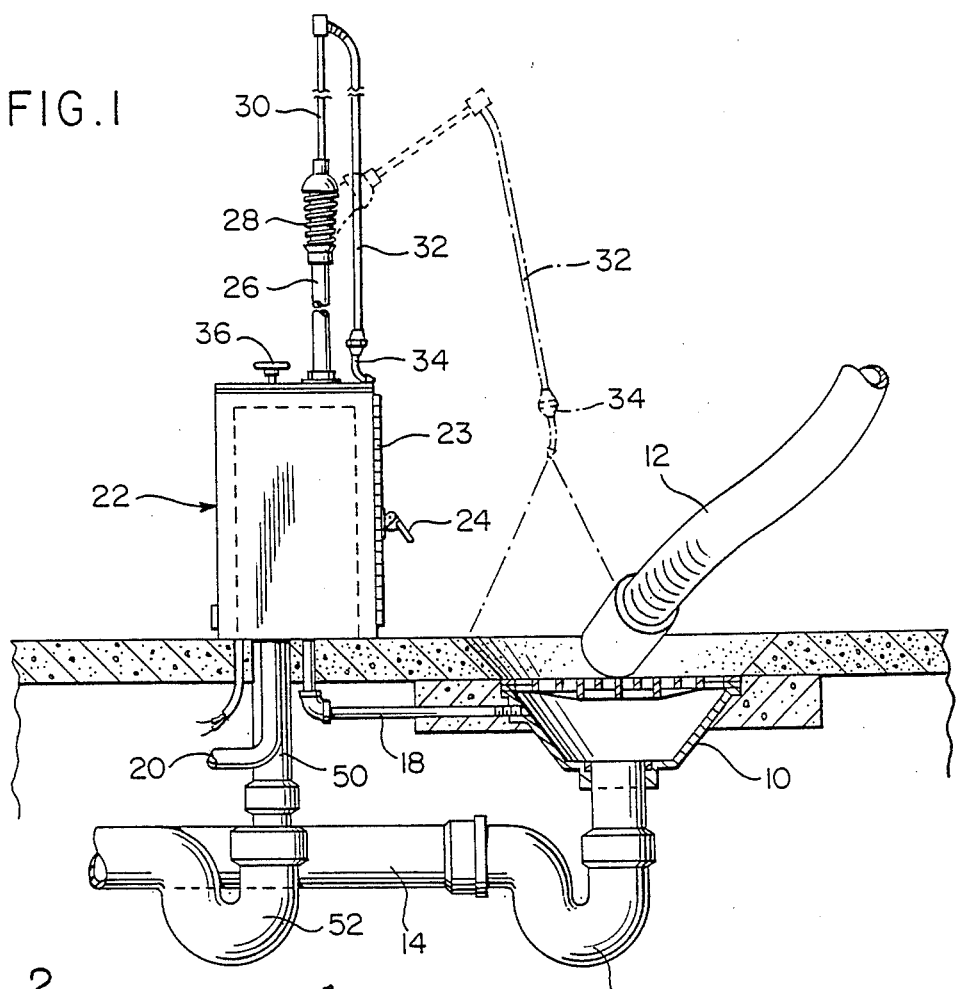
FIG. 1 is an elevational view, with parts in section, of a sanitary dumping bay and potable water system in accordance with the invention.

Referring initially to FIG. 1, there is shown an in-ground sanitary flushing drain 10, which may be of a type found at campsites or the like, for the disposal of waste from a recreational vehicle which is dumped in the drain by an outlet hose 12, for example, extending from a vehicle holding tank. The drain 10 discharges the waste through a conventional discharge conduit 14 which may include a trap 16 based upon local plumbing code requirements. In accordance with the invention to facilitate waste discharge from the drain, it is provided by the installer with a flushing pipe 18 which receives flushing water from a water main 20 through a water control supply assembly contained in a box-like enclosure 22, and which is actuated to flush the drain through a freeze-proof flusher foot pedal 24 projecting from the enclosure 22. Further, the water supply assembly also includes means for delivering the mains water to a standpipe 26 having a spring-loaded flexible tube connection 28 with a delivery pipe 30, hose 32 and hand-held outlet nozzle 34 which can be used to supply potable water for the recreational vehicle, or which can be used to supply additional water to assist in flushing waste through the drain 10 and cleansing components. Control of the mains water supply to standpipe 26 is obtained through a rotary handwheel 36.

Figure 2:
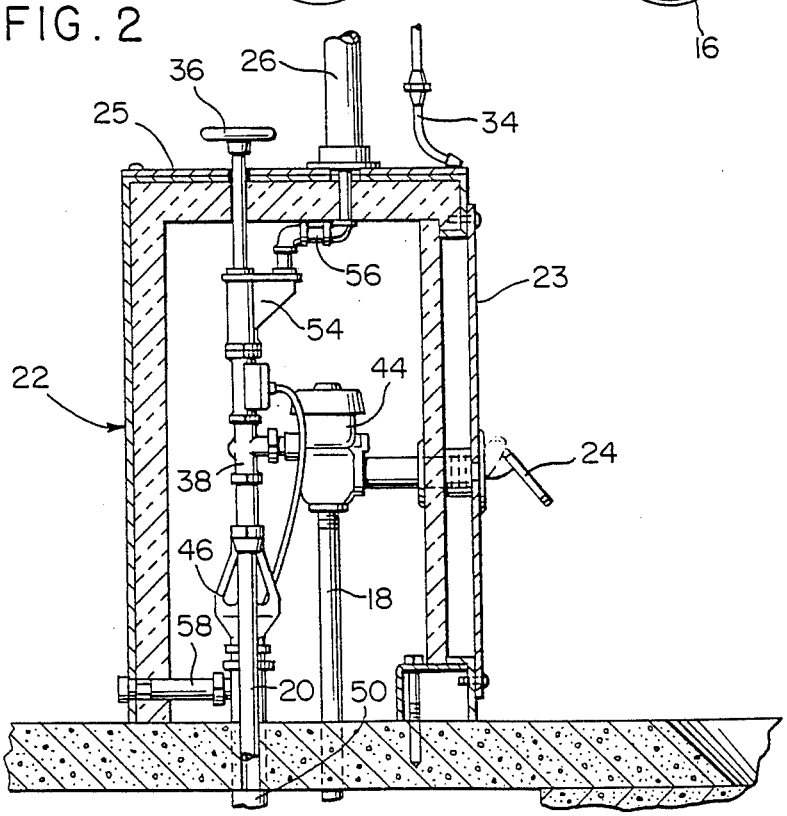
FIG. 2 is a transverse, sectional view of an enclosure containing the water control and supply system.
Figure 4:
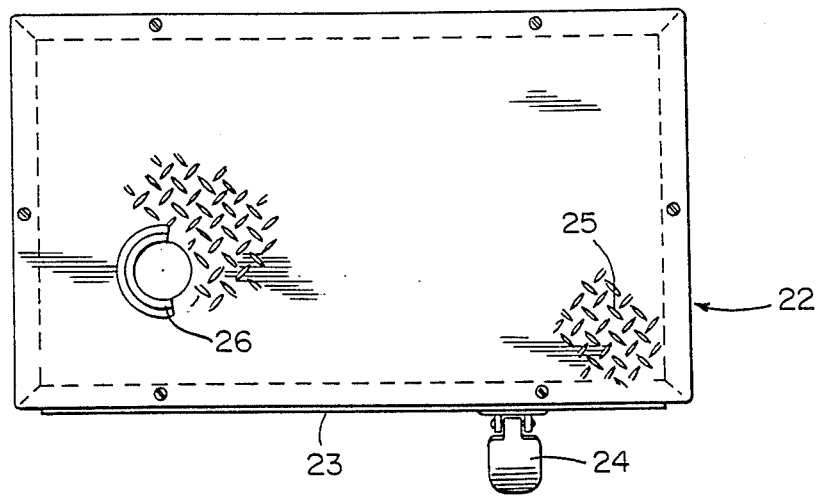
FIG. 4 is a plan view of the enclosure.
Figure 3:
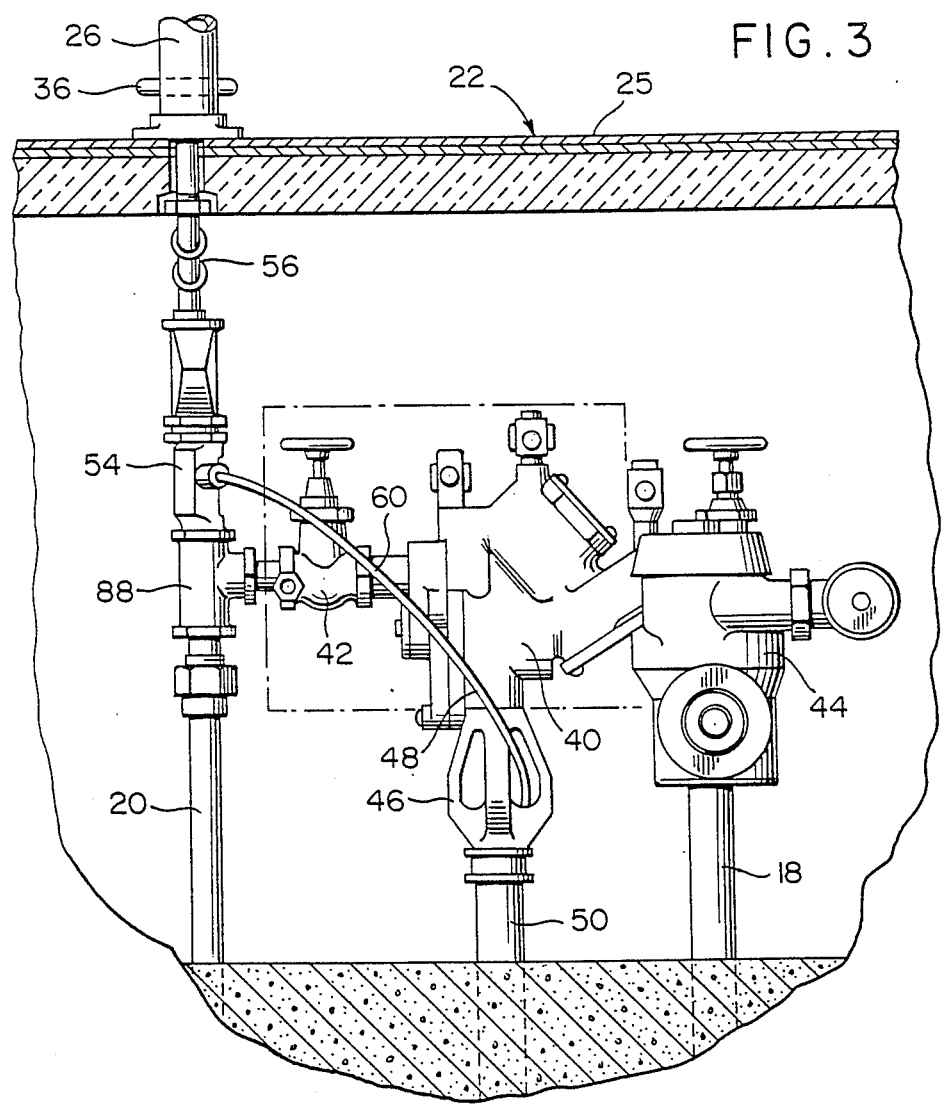
FIG. 3 is a further enlarged sectional view of the enclosure and water control and supply system.

The components of the water supply system within enclosure 22 are described in more detail with reference to FIGS. 2 and 3 in particular. Thus, within enclosure 22, the water mains 20 is connected through a T-fitting 38 to a manual shut-off valve 42, a double, in-line check valve 40, and a flush valve 44 operated by a foot pedal 24. Valves 40 and 44 together define a water supply and backflow preventer assembly and may be standard Watts and Sloan valves known for this purpose. Further, valve 40 is provided with an air-gap device 46 connected to its bottom outlet 48, the air-gap device discharging into a drain 50 which may also include trap 52. In the event of backflow into valve 40, the backflow liquid is passed through the air-gap device into the drain.

The other outlet from T-fitting 38 is connected to an engineered hydrant 54 having a connection 56 with standpipe 26 and an internal shut-off valve, not shown, operated by handwheel 36. After use of the standpipe, water trapped therein is drained through hydrant 54, a hose connection 60, and air-gap device 46. This system provides a freeze-proofing facility for the water column and hydrant, and also serves as a warm weather drain trap primer.

The air-gap drain line 50 is also plumbed with an atmospheric vent line 58 which may be fitted with a bug and rhodent-proof screen, not shown.

Enclosure 22 may, for example, comprise a weatherproof, eleven gauge steel container with a hinged vandal-proof service door 23 and a 3/16" safety plate, vandal-proof, removable, load rated top 25. Additional equipment which may be provided in the fitting includes, for example, a low-voltage electric heater, and a water hammer arrester device (not shown).

The typical installation of this invention incorporates the required vehicle facilities into one central, serviceable unit, accessible to the user and is constructed, specifically, but not exclusively, for installation on both public and private recreational vehicle facilities such as rest areas, campgrounds, state and federal parks, trailer parks, etc. Further, the invention is constructed with user sanitation convenience in mind as well as ease of maintenance, weather protection of components, and with vandal and freeze-proof features.

The invention consists essentially of (1) a water control supply assembly, (2) a sanitary flushing drain and (3) a sealed containment unit. Sub-assemblies consist of (4) a freeze-proof, foot-operated flush valve, (5) a double, in-line check valve, backflow preventer and (6) a water column assembly. The volume controlled water supply valve is used for flushing waste from the adjacent sanitary drain. The spring loaded flexible water column, which mounts to the top of the fabricated container, serves a dual function. Its primary function is to provide the user with a potable water supply suitable for filling recreational vehicle or portable holding tanks. Its secondary function is to provide for washing down of any solid waste that may not fall directly into the sanitary drain receiver. The backflow prevention unit is equipped with air gap device, installed directly on the bottom of the assembly. In the event of backflow into the valve, it would be passed through the air gap to the drain below. The air gap also receives the water column drainage after each use. All potable water trapped in the water column upon closure of the supply valve is drained through the engineered hydrant to the drain below. This achieves not only freeze proofing of the water column and hydrant, but serves as a warm climate drain trap primer as well. The air gap drain line is also plumbed to accept an atmospheric vent, fitted with a bug and rodent-proof screen. All of the aforementioned components are housed in a weather-tight, eleven gauge steel container. This fabricated structure is serviceable through a hinged, vandal-proof door, or its 3/16" safety plate, vandal-proof, load-rated top. The container is provided with insulation installed in the interior thereof for additional freeze protection.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with a drain for disposing of waste received from a recreational vehicle and a potable water supply line, means for providing a controlled flushing of the drain and means for providing a controlled supply of potable water to resupply a recreational vehicle and clean the drain independent of flushing the drain, said means supplying potable water including a hand-operated valve communicated with said water supply line, an upwardly extending standpipe communicated with the hand-operated valve, a hose connected with the upper end of the standpipe and a discharge nozzle on the end of said hose for resupplying a recreational vehicle with potable water and providing cleaning and flushing water to the drain and water to clean other components, said standpipe including a resilient section enabling lateral movement of the upper end thereof to enable the nozzle to be moved to a position beyond that which would be permitted by the hose connected to a rigid standpipe, said means for flushing the drain including a foot-operated valve communicated with the potable water supply line and a flush water line connected with said foot-operated valve and said drain, said foot-operated valve and hand-operated valve including freeze-proof drain means and a backflow preventing means including an air gap, and a rigid housing enclosing said valves, supply line, freeze-proof drain means and backflow preventing means, said foot-operated valve including a foot pedal actuator disposed exteriorly of the housing, said hand-operated valve including a handwheel actuator disposed above the top of the housing, said housing including access panel means providing access to the interior thereof.

2. A recreational vehicle sanitary dumping bay and potable water supply assembly comprising an upwardly opening drain having an upwardly exposed surface, said drain being supported generally at ground level enabling a recreational vehicle to pull alongside thereof and discharge waste from its holding tank into the drain by gravity flow through a flexible hose, a potable water supply means extending to a position adjacent said drain, a pair of manually operated valves connected with said water supply means, a drain flushing pipe extending from one of said valves to the drain below the upwardly facing surface thereof for flushing the drain when said one valve is opened, a potable water delivery means connected to the other of said valves, said delivery means including a flexible outlet hose having a handheld nozzle on the outer end thereof to supply water to the recreational vehicle and discharge water onto the upwardly facing surface of the drain and surfaces adjacent thereto, said drain flushing pipe being communicated with the drain below the upwardly facing surface thereof, said drain including a drain line extending from the bottom portion of the upwardly facing surface thereof with the water discharged from the nozzle cleaning the upwardly facing surface with the flushing water discharged from the drain flushing pipe being independently controlled and the flushing water discharged from the nozzle being independently controlled by operating said valves, said delivery means including an upwardly extending standpipe connected to said other valve, said hose being connected to the upper end of the standpipe and having a length less than the distance between the upper end of the standpipe and the drain to prevent contact of the nozzle with the drain but enabling the nozzle to be manipulated to flush the upwardly facing surface of the drain and adjacent surface areas, said standpipe including a flexible, resilient intermediate section that enables the upper end of the standpipe to swing laterally upon exertion of tension force on the hose to facilitate manipulation of the nozzle when flushing the drain and when supplying water to the recreational vehicle, and a weatherproof housing rigidly supported adjacent the drain and enclosing said valves with the standpipe extending vertically from the upper end thereof, each of said valves including an actuator positioned externally of the housing to enable manipulation of the valves.

3. The structure as defined in claim 2 wherein said valve actuator for said other valve being disposed above the top of the housing for access thereto when using the hose and nozzle, the valve actuator for said one valve for the drain flushing line including a foot pedal actuator disposed externally of the periphery of the housing adjacent the drain to facilitate access thereto while observing the drain.

4. The structure as defined in claim 3 wherein said drain is incorporated into a deck with the upwardly opening surface of the drain being flush with the deck to facilitate positioning of the outlet end of the outlet hose from the holding tank of the recreational vehicle therein and enabling the outlet end of the flexible hose to be cleaned by directing water thereon from the nozzle thereby enabling the draining of a holding tank of a recreational vehicle to an in-ground drain under sanitary conditions.

* * * * *